Patented Nov. 27, 1928.

1,693,402

UNITED STATES PATENT OFFICE.

ALFRED J. A. PETERSON, OF WILKINSBURG, PENNSYLVANIA, ASSIGNOR TO WESTINGHOUSE ELECTRIC & MANUFACTURING COMPANY, A CORPORATION OF PENNSYLVANIA.

RELAY SYSTEM.

Application filed March 27, 1925. Serial No. 18,893.

My invention relates to protective relay systems and particularly to systems having differentially-connected relays for the protection of electrical apparatus.

One object of my invention is to provide a relay system for the protection of transformers or other electrical apparatus associated with a plurality of transmission circuits, in which the transformers may be operated in parallel from one or more circuits or a plurality of circuits connected to one or more transformers without affecting the protective system.

Another object of my invention is to provide a system comprising two transformers, two parallel transmission circuits that may be operated in parallel or with both of said transformers connected to one circuit, and differential relay protection for the transformers that is operative under each of the different connections.

Figure 1:
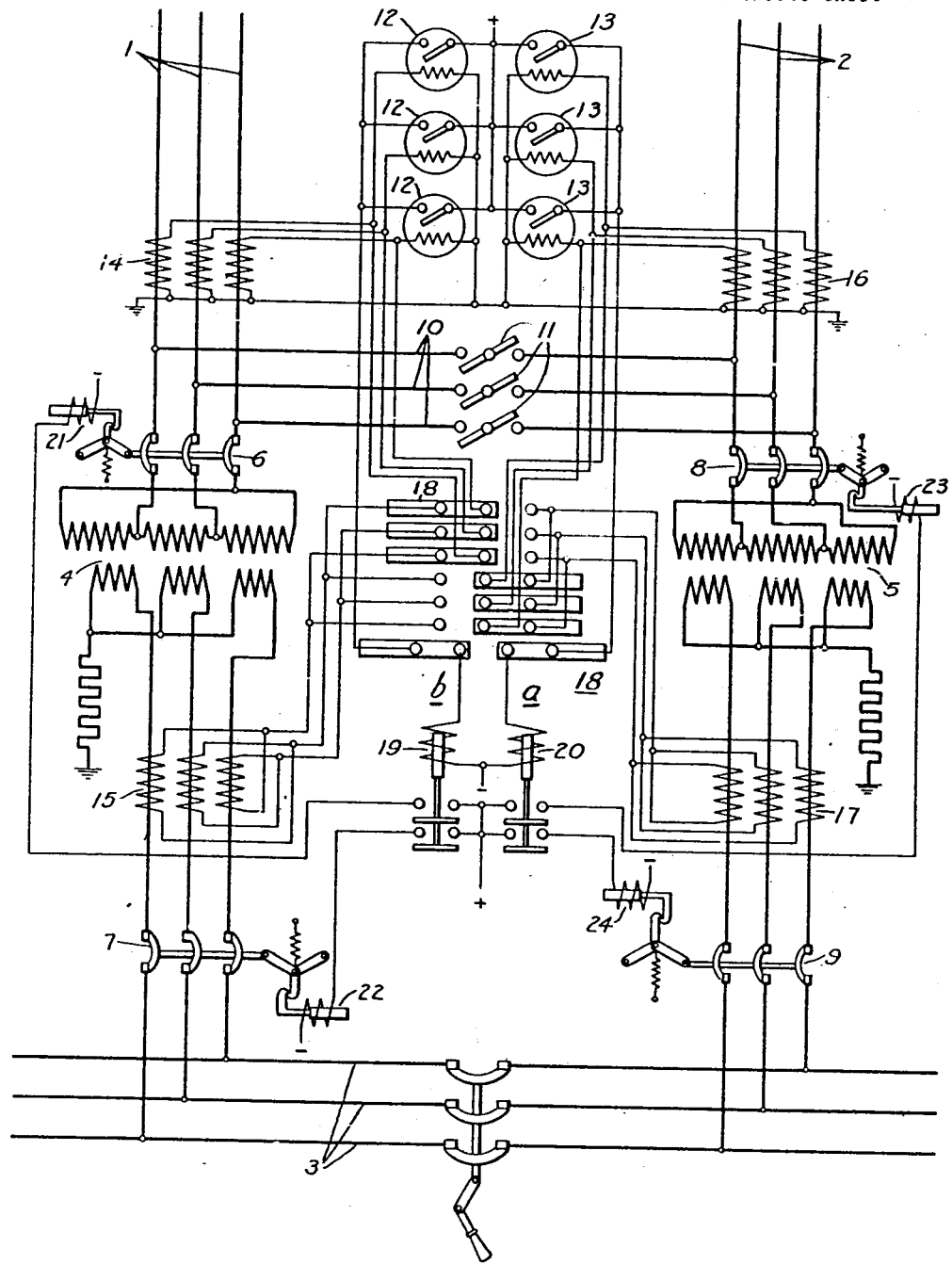
Figure 2:
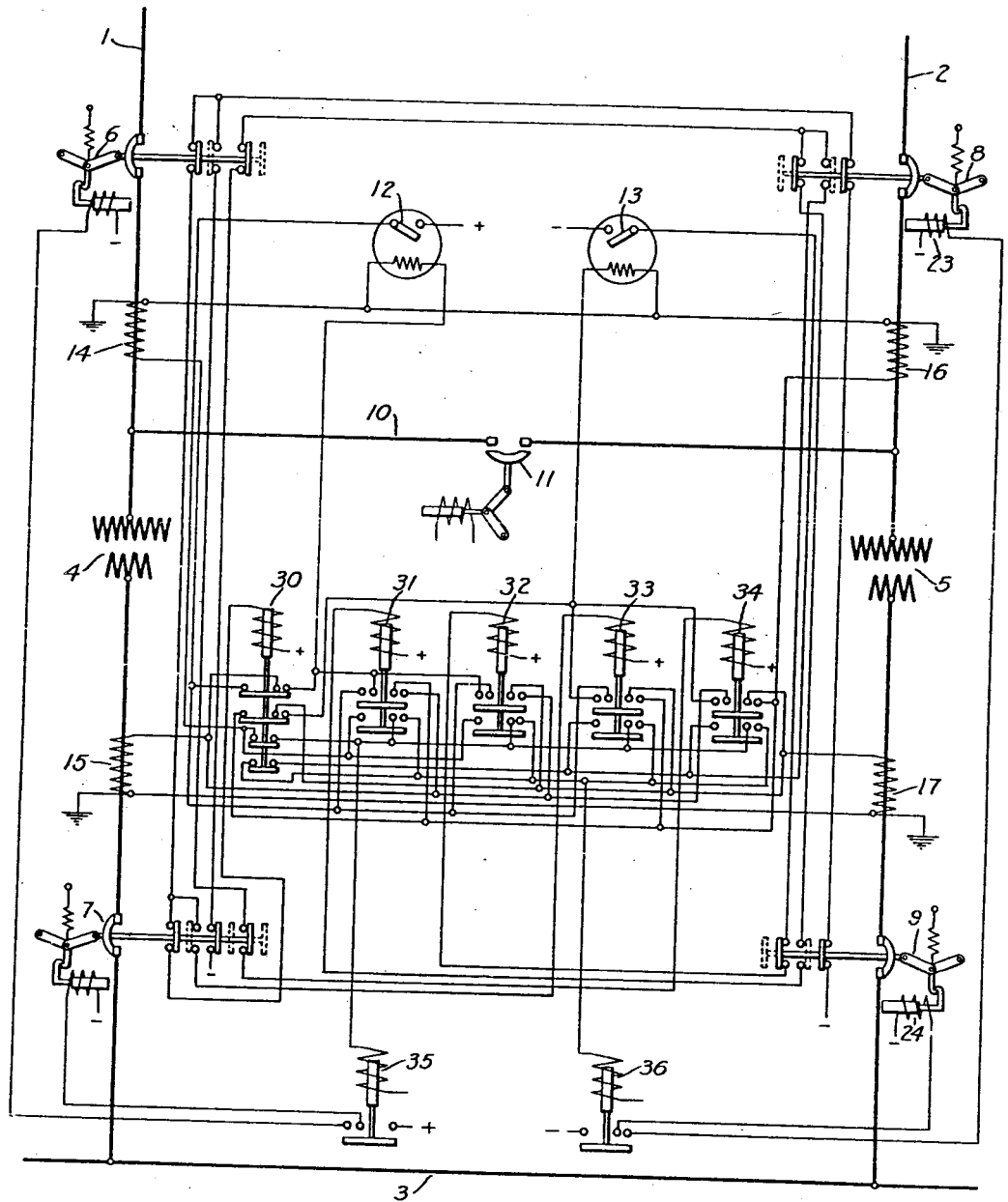

For a better understanding of my invention, reference may be had to the accompanying drawings, in which Fig. 1 is a diagrammatic view of an electrical system embodying my invention; and Fig. 2 is a similar view of a modification thereof.

Referring to Fig. 1, a distribution system comprises parallel transmission circuits 1 and 2, connected to the busbars 3 through the three-phase transformers 4 and 5, and circuit interrupters 6, 7, 8 and 9 interposed between the transmission circuits and the busbars for disconnecting the circuits and isolating the transformers. Cross-connecting busbars 10 are provided to permit both of the transformers 4 and 5 to be connected in parallel to either of the transmission circuits. A disconnecting switch 11 in the busbars 10 permits separate operation of the transmission circuits and the transformers.

The transformers 4 and 5 are protected against faults by over-current, time-element relays 12 and 13, respectively. The relays 12 are normally connected to differentially-connected current transformers 14 and 15 in the transmission circuit 1 and the relays 13 are normally connected in a similar manner to current transformers 16 and 17 in the transmission circuit 2. The current transformers 14 are connected in star and the current transformers 15 are connected in delta, because of the delta-star connection of the windings of the transformer 4.

The windings of the current transformers 14 and 15 are connected in opposition, and under normal conditions, no current traverses the relays 12. The connections of the relays 12 and 13 to the current transformers 14, 15, 16 and 17 may be altered by means of a transfer switch 18. The transfer switch 18 also controls the circuits of relays 19 and 20 that energize the trip coils 21, 22, 23 and 24 of the circuit interrupters 6, 7, 8 and 9 under predetermined conditions.

If the circuit interrupters 6, 7, 8 and 9 are closed, the switch 11 is open and the transfer switch 18 is in the position shown, the two transmission circuits 1 and 2 are both connected to the busbars 3 and the load on this bus is divided between the two circuits. Since the current transformers 14 and 15 are connected in opposition, no current traverses the relays 12; likewise by reason of the differential connection of the current transformers 16 and 17, no current traverses the relays 13.

In the case of a fault, such as a short-circuit, in one of the transformers 4 or 5, the current transformers associated with this transformer become unbalanced and one of the relays 12 or 13 is energized. The energization of the relay closes a circuit from battery through its contacts, the lower contact member of the transfer switch 18 and one of the relays 19 or 20, depending upon which transformer has developed the fault. If we assume that the transformer 4 has developed a fault, the operation of relay 19 closes circuits through the trip coils 21 and 22, thereby opening the circuit interrupters 6 and 7 to isolate the defective transformer. If the transformer 5 develops a fault, the operation of relay 20 energizes the trip coils 23 and 24 of the circuit interrupters 8 and 9, thereby disconnecting this transformer from the circuit.

Under certain conditions, it is necessary to operate both of the transformers 4 and 5 in parallel through one of the transmission circuits. For instance, the circuit 2 may be out of service and the capacity of the transformers so limited that both are required to carry the full load of the busbars 3. In this case, the switch 11 is closed, thereby connecting both of the transformers 4 and 5 to the circuit 1. At the same time, the transfer switch 18 is thrown to the right-hand position a to modify the relay connections as required. In this position, the secondary windings of the current transformers 14 are connected through the three upper segments of the transfer switch to the secondary windings of the current transformers 15 and 17 in parallel, and the secondary circuits of the current transformers 16 are interrupted at the fourth, fifth and sixth segments of the transfer switch. The lower left-hand segment of the transfer switch 18 connects the relays 19 and 20 in parallel to the contact members of the relays 12.

Under normal conditions, therefore, the current transformer 14 balances the current transformers 15 and 17, since the total load on the secondary windings of the transformers 4 and 5 is equal to that traversing the circuit 1. In case either transformer develops a fault, the current transformers become unbalanced and one of the relays 12 is energized. The energization of relay 12 closes circuits through the relays 19 and 20 in parallel, whereupon the circuits of the trip coils 21, 22, 23 and 24 are closed and the circuit-interrupters 6, 7, 8 and 9 are actuated to disconnect the transformers 4 and 5 from the circuit. If it is desired to operate the transformers 4 and 5 in parallel connected to the transmission circuit 2, the operation is the same as that just described, except that the transfer switch 18 is actuated to the left-hand position b to connect the current transformers 16 in opposition to the current transformers 15 and 17.

The alternative arrangement wherein both of the transmission circuits may be connected in parallel to a single transformer is effected, when necessary, by a transfer switch (not shown) similar to the transfer switch 18 and arranged to balance the current transformers 15 or 17 against the current transformers 14 and 16 in parallel.

It will be apparent that a system embodying my invention allows flexible operation to meet the various conditions which arise in practice without sacrificing the advantages of differential protection of the apparatus units. When a change is made in the system connections, the operation of a switch alters the relay connections to provide the same relay protection under all conditions.

If desired, the revision of the relay connections may be effected automatically upon the operation of the main circuit-interrupters. In Fig. 2 is shown a system in which this result is accomplished. The system is similar to that shown in Fig. 1, although the polyphase distribution circuits are represented by single lines for the sake of simplicity, and comprises two parallel transmission circuits 1 and 2 connected to the busbars 3 through the transformers 4 and 5 and the circuit-interrupters 6, 7, 8 and 9. A cross-connecting circuit 10 which may be interrupted by a switch 11, is provided to permit the transformers 4 and 5 or the transmission circuits 1 and 2 to be operated in parallel.

Differential protection of the transformers 4 and 5 is provided by the relays 12 and 13 connected to the differentially-related current transformers 14, 15, 16 and 17.

In order to change the connections of the relays 12 and 13 and the current transformers 14—17 in accordance with the connections of the transformers 4 and 5 to the circuits 1 and 2, relays 30, 31, 32, 33 and 34 controlled by the auxiliary or pallet switches on the interrupters 6, 7, 8 and 9 are provided. If the interrupters 6, 7, 8 and 9 are all closed, a circuit is closed through the pallet switches of the four interrupters for energizing the relay 30. If the interrupter 9 is open, a similar circuit is completed for energizing the relay 31. Likewise if the interrupter 8, 7 or 6 is open, the respective relay 32, 33 or 34 is energized.

The relays 30, 31, 32, 33 and 34 control the circuits of the relays 12 and 13 and current transformers 14, 15, 16 and 17 to maintain differential protection of the transformers 4 and 5. Thus, if the circuit-interrupters 6, 7, and 8 and 9 are all closed and the transformers 4 and 5 and the circuits 1 and 2 are operating in parallel, the relay 30 is energized as described above to connect the secondary windings of the current transformers 14 and 15 in opposition and the secondary windings of the transformers 16 and 17 in opposition. Under normal conditions, therefore, no current traverses the windings of relays 12 and 13. If the transformer 4 develops a fault, relay 12 is energized to close a circuit through the second contact member of relay 30 for energizing a relay 35 controlling the tripping circuits of the circuit interrupters 6 and 7, thereby isolating the defective transformer. On the other hand, if the transformer 5 develops a fault, the relay 13 closes a similar circuit through the lower contact member of the relay 30 for energizing a relay 36 and thereby tripping the circuit-interrupters 8 and 9.

If the circuit-interrupter 9 is open and the transmission circuits 1 and 2 are connected in parallel to the transformer 4, the energization of the relay 31, as described above, connects the secondary winding of the current transformer 5 in opposition to the secondary windings of the current transformers 14 and 16 in parallel, thereby maintaining differential protection for the transformer 4. If the transformer develops a fault, relay 12 is energized and closes circuits through the lower contact member of relay 31 for energizing the relays 35 and 36, thereby tripping the circuit-interrupters 6, 7 and 8. The operation is similar in case the interrupter 7 is open, the relay 33 being energized.

If the circuit-interrupter 8 is open and the two transformers 4 and 5 are connected in parallel to the transmission circuit 1, the operation of relay 32, as described above, connects the secondary winding of the current transformer 14 in opposition to the secondary windings of the current transformers 15 and 17 in parallel. If either transformer develops a fault, relay 12 is energized and closes circuits through the lower contact member of relay 32 for energizing relays 35 and 36 to trip the interrupters 6, 7 and 9. If the interrupter 6 is open and the transformers 4 and 5 are connected in parallel to the transmission circuit 2, the operation is similar, the relay 34 being energized.

If it is only desired to operate the transformers 4 and 5 in parallel with either one or both transmission circuits or to operate the transmission circuits 1 and 2 in parallel with either one or both transformers, certain of the relays 31, 32, 33 and 34 may be omitted. In general, the principles outlined may be extended in obvious ways to meet varying conditions. Accordingly, I desire that my invention be only limited as indicated in the appended claims.

I claim as my invention:

1. A system comprising a plurality of transmission circuits, a transformer in each of said circuits, differential means including relays for protecting said transformers, circuit-interrupters for altering the relation of said circuits and transformers, and means for altering the connections of said relays in accordance with the operation of said circuit-interrupters.

2. A system comprising two parallel transmission circuits, a transformer in each of said circuits, differential means including relays for protecting said transformers, means for connecting both of said transformers to one of said circuits when desired, and means including a switch for altering the connections of said relays when such a connection is established.

3. A system comprising two parallel transmission circuits, two main transformers, differentially-connected current transformers on opposite sides of said main transformers, protective relays connected to said current transformers, and means for altering the connections of said current transformers to said relays for maintaining a current balance under normal conditions whether said main transformers are connected separately to said transmission circuits or in parallel to one of said circuits.

4. A system comprising two parallel transmission circuits, two electrical units, means for connecting either or both of said circuits to both of said units, differential relay protective devices for said units normally connected to the opposite sides thereof, and means for altering the connections of said relay protective devices in accordance with the connection of said units in said circuits.

5. A system comprising two parallel transmission circuits, two electrical units, means for connecting either or both of said circuits to both of said units, differentially-connected current transformers on opposite sides of both of said units, relays connected to said current transformers and a switch for altering the connection of said current transformers and relays in accordance with the connection of said units in said circuits.

6. A system comprising a plurality of transmission circuits, a plurality of electrical units, differential protective means associated with each of said units, means for connecting one or more of said units to one of said circuits as desired and automatic means for maintaining said protective means operative when the number of units so connected is altered.

In testimony whereof, I have hereunto subscribed my name this 13th day of March, 1925.

ALFRED J. A. PETERSON.